Figure 3A:
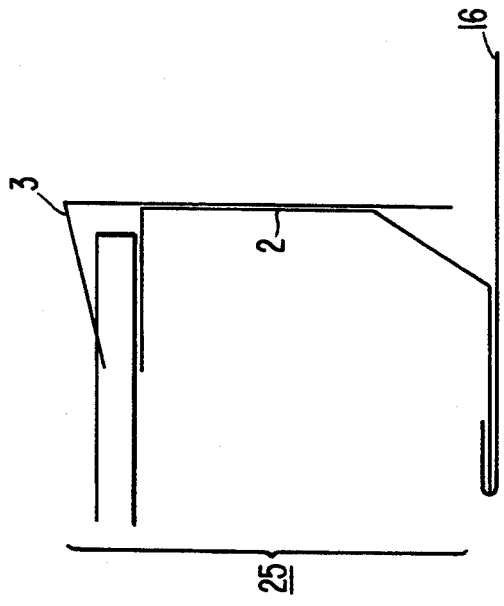

United States Patent [19]
Rich

[11] Patent Number: 5,404,867
[45] Date of Patent: Apr. 11, 1995

[54] SOLAR COLLECTOR VENTING SYSTEM

[76] Inventor: Albert C. Rich, 5840 Gibbons Dr.., Carmichael, Calif. 95608

[21] Appl. No.: 20,432

[22] Filed: Feb. 22, 1993

Related U.S. Application Data

[63] Continuation-in-part of Ser. No. 862,227, Apr. 2, 1992, abandoned.

[51] Int. Cl.6 .................................................. F24J 3/02
[52] U.S. Cl. .................................... 126/599; 126/570; 126/705; 126/706
[58] Field of Search ............... 126/599, 588, 596, 570, 126/589, 704, 705, 706, 707, 708

[56] References Cited

U.S. PATENT DOCUMENTS

| | | | |
|---|---|---|---|
| 4,046,134 | 9/1977 | Scott | 126/599 |
| 4,226,225 | 10/1980 | Niedermeyer | 126/599 |
| 4,392,481 | 7/1983 | Moore | 126/418 |
| 4,396,004 | 8/1983 | Koenig | 126/418 |
| 4,422,443 | 12/1983 | Arendt | 126/418 |
| 4,637,376 | 1/1987 | Varney et al. | 126/451 |
| 4,930,492 | 6/1990 | Rich | 126/588 |

*Primary Examiner*—Larry Jones
*Attorney, Agent, or Firm*—Finnegan, Henderson, Farabow, Garrett & Dunner

[57] ABSTRACT

A solar collector venting system comprising a lower frame member with vents which allow the entrance of cooling air when high collector stagnation temperatures occur communicating with the natural downward thermal bowing of a two walled plastic glazing caused by differences in coefficients of expansion between the cooler upper layer and the hotter inner layer of plastic glazing communicating with an upper frame member with stationary fulcrum points communicating with vents in between the fulcrums points which, upon bowing of the glazing cause the upper end of the glazing sheet to lift up off the top frame member allowing an open path for the flow of cooling air to pass up thru the collector between the absorber and the plastic glazing whose path may be kept clear by communicating with flow path spacers on the absorber.

14 Claims, 4 Drawing Sheets

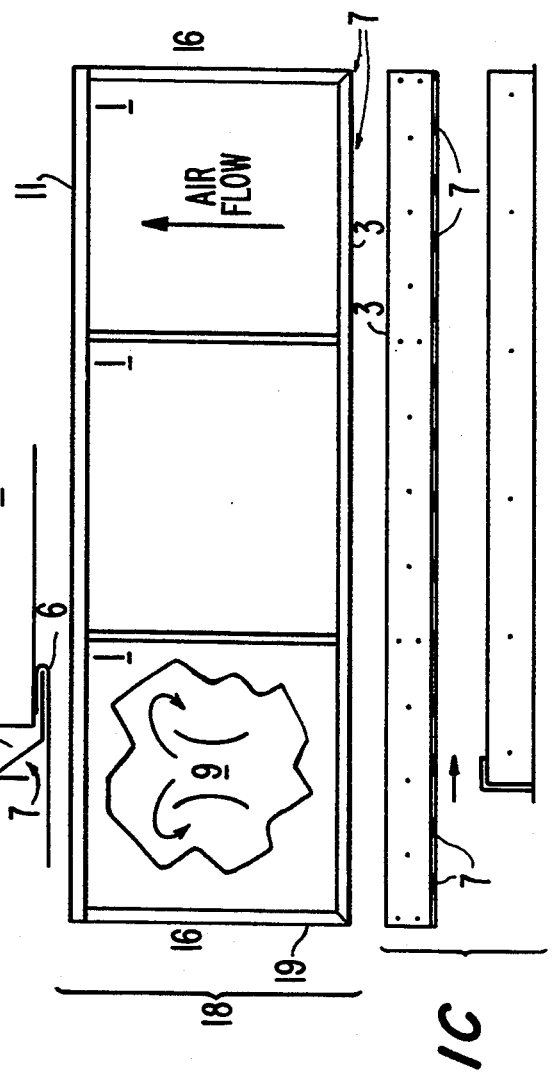

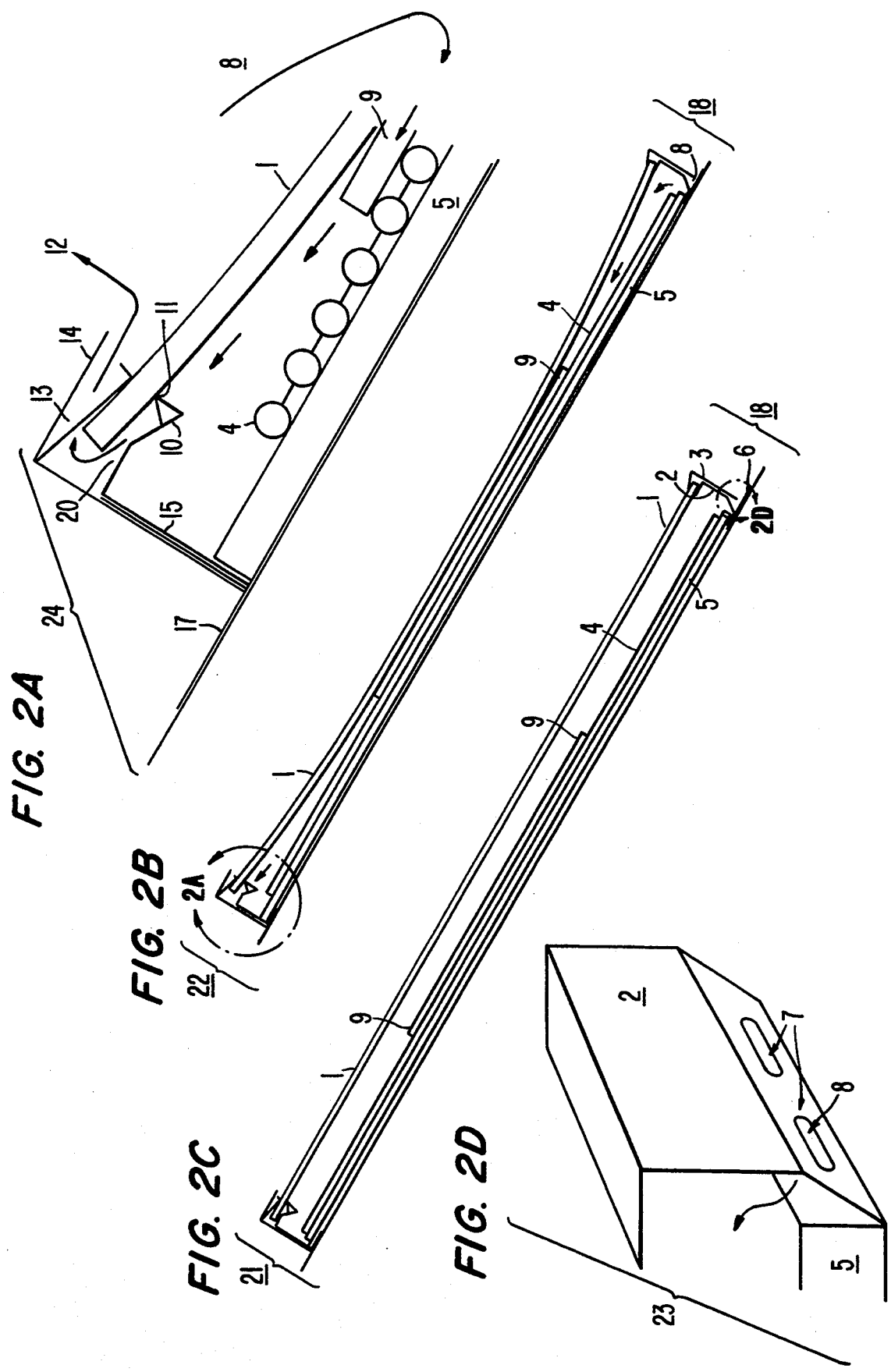

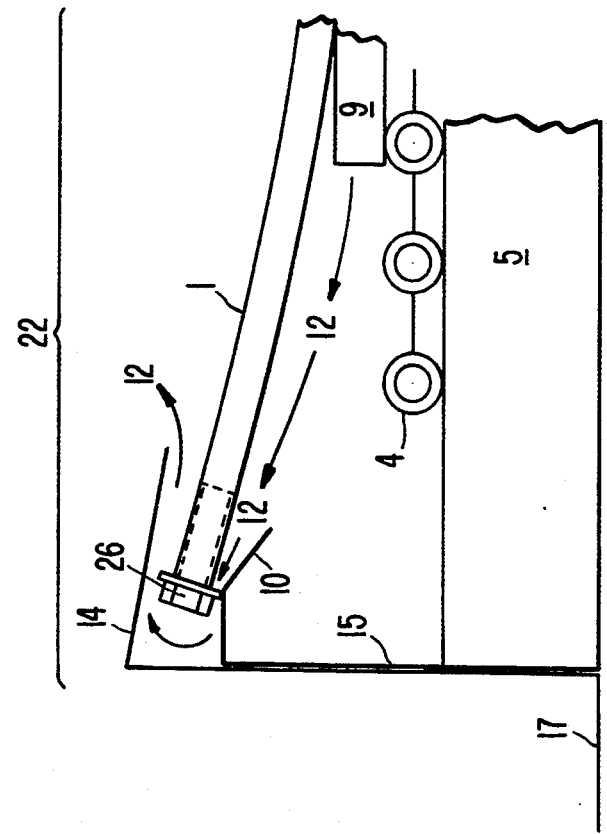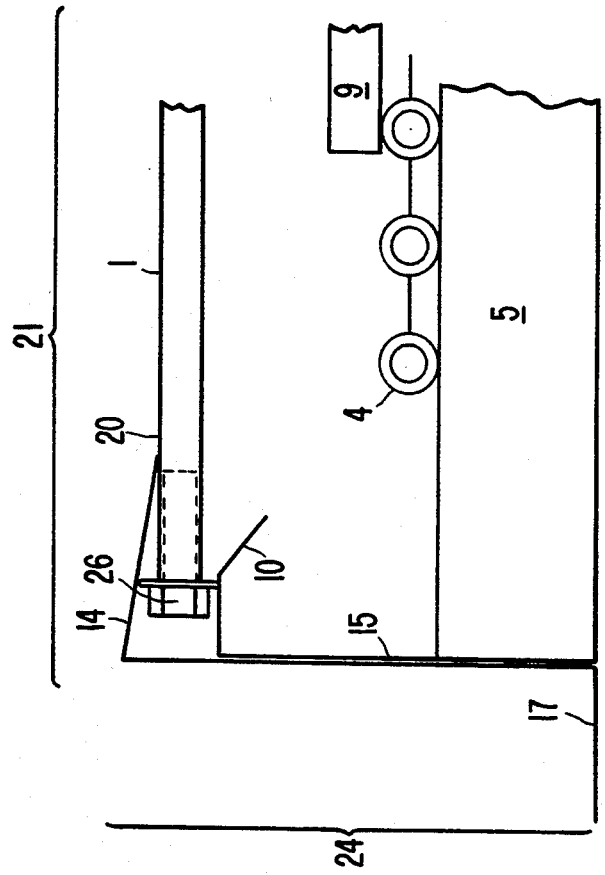

SOLAR COLLECTOR VENTING SYSTEM

This application is a continuation-in-part of application Ser. No. 07/862,227, filed Apr. 2, 1992, now abandoned.

BACKGROUND OF THE INVENTION

1. Field of the Invention

The present invention relates to an improved solar thermal collector which allows the use of plastics and rubber materials that need to be kept at safe temperatures to allow for a long life.

2. Description of the Prior Art

The tremendous increase in concern for our environment and the resultant pressure on utilities to reduce pollution and even to close nuclear plants is opening a large market for renewable energy products that are cost effective. Previous solar thermal collectors used heavy glass and aluminum extrusions as well as expensive copper as their primary components. These components not only made the collectors heavy and expensive but also difficult to install. It is necessary to make available collectors using less expensive plastic and rubber materials to truly open up a large solar market.

A previous invention by Albert C. Rich, "Solar Water Heating System" U.S. Pat. No. 4,930,492 allowed for the satisfactory use of a rubber absorber plate by the use of a special floating valve. The system worked well but it became apparent that high stagnation temperatures over 250 degrees could result in the reduced life expectancy of the rubber collector absorber and plastic glazing materials. To protect against this situation the inventor devised a simple passive venting system that takes advantage of the natural tendency of the two walled ("Twinwall") transparent plastic glazing to bow. This never before devised venting system effectively solves the last barrier to the use of plastic and rubber materials in solar thermal collectors. One of the reasons it was never devised before is similar to the reason the inventors floating valve had never been devised before, that is because the need for the item had never been recognized in a solar application.

SUMMARY OF TEE INVENTION

The objects and advantages of the invention will be set forth in art in the description which follows and in part will be obvious from the description, or may be learned by practice of the invention. Additional objects and advantages of the invention may be realized and attained by means of the instrumentalities and combinations particularly pointed out in the specifications and the appended claims. Additionally working collectors incorporating U.S. Pat. No. 4,930,492 and the invention are available for inspection.

To achieve the forgoing objects and in accordance with the purpose of the invention, as embodied and broadly described herein, there is disclosed a solar thermal collector comprising:

A solar absorbing means communicating with an insulating material which communicates with top, side and bottom frame means which communicate with a twin walled transparent plastic glazing means;

A bottom trim means which holds down the twin walled transparent plastic glazing means communicating at once with the lower frame member which has slots along the full length of the collector whose means are hidden and protected by the lower trim means which allows a narrow gap between the lower trim means and the mounting strip means:

A top trim means which communicates with stationary glazing hold down spring means communicating with the transparent plastic glazing means which communicates and seals fully with the top frame member means which has a bent down means to allow for a vent path in turn communicating with a level frame fulcrum point directly underneath the glazing means which is directly below the hold down spring means;

Vertical flow path spacers communicating with the absorber means to prevent closing off of the vent path when the transparent plastic glazing means bows downward in the direction of the absorber under stagnation conditions at which time the vertical flow path spacers communicate with the glazing and the absorber.

BRIEF DESCRIPTION OF TEE DRAWINGS

Figure 3B:
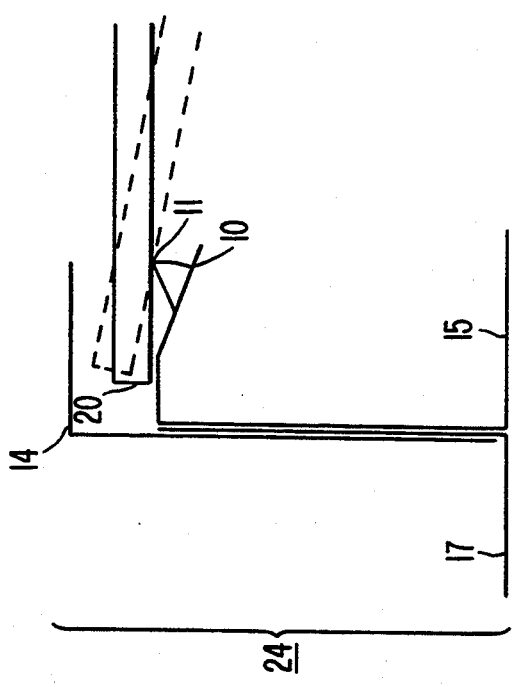
Figure 3C:
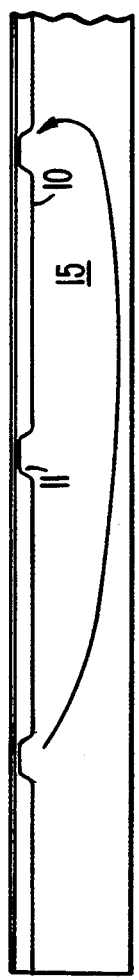
Figure 3D:
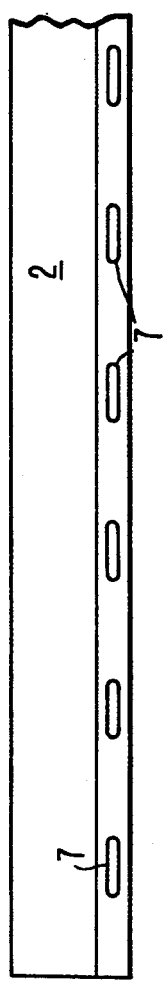

FIG. 1A-D is a drawing showing all the components and locations of features embodied in the present invention;

FIG. 2A-D is a sectional side view drawing of the collector in its roof mounted operational and stagnation position with details of the bottom frame air path and upper frame air path;

FIG. 3A-D contains diagrams of the Vented Collector Assembly with Top and Bottom frame details; and FIG. 4 contains sectional side view drawings of the collector in its roof mounted position showing the operational position at Detail 21 and the stagnation position at Detail 22 for an alternative embodiment of the invention.

DRAWING NUMBERED CODE SCHEDULE

1 LEXAN TM, which is a polycarbonate material, or other twin walled plastic glazing
2 Bottom frame member which contains vent slots
3 Bottom trim cap which holds down the plastic glazing and shields the vent slots from weather
4 Absorber
5 Insulation board which acts structurally and to hold absorber
6 Bottom mounting lip for mounting collector on roof
7 Vent slots in bottom frame member
8 Air path thru bottom frame member which goes up between absorber and plastic glazing being spaced by 9 and up thru path 12 in top frame member
9 Flow path spacers
10 Bend in upper frame 15 to allow for an air flow 8 to go thru passage 12
11 Tab in 10 which is bent up to contact plastic glazing 1, causing a fulcrum action to create passages 12 between a multiple of tabs
12 Air flow path that opens when plastic glazing 1 bows due to high temperatures allowing 8
13 Small spring which holds plastic glazing against top frame 15 to seal air from escaping when collector is in normal operation
14 Top frame trim strip which holds 13 and protects against weather
15 Top frame member which contains 10 and 11
16 Collector end trim strip
17 Collector top mounting strip
18 The solar energy collector as a whole
19 Collector housing
20 Top frame member plastic glazing seal
21 Collector in normal operation
22 Collector in stagnation condition 23 Bottom frame detail showing frame slots
24 Upper frame detail
25 Lower frame detail
26 Fulcrum spacer, which creates a space above and below glazing plate 1 so that air can flow above and below glazing plate 1 when glazing plate 1 bows.

DESCRIPTION OF TEE PREFERRED EMBODIMENTS

Reference will now be made in detail to a preferred embodiment of the invention, an example of which is illustrated in the accompanying drawings. Wherever possible the same reference numbers will be used throughout the drawings to refer to the same or like parts.

Referring to FIG. 1, the solar collector venting system of the present invention is illustrated in drawings of the various components and locations of features.

The solar energy collector 18 comprises a solar energy absorbing means 4 contained in a housing 19. It is important to locate the collector so that the top to bottom vent 25 is over 18 degrees from a horizontal plain from 24 to facilitate the passive venting feature which is dependent upon the laws of thermosiphoning dynamics (hot air rises).

The solar collector venting system comprises a bottom frame member 2 with slots 7 along its lower length, an air path 8 which extends from a space at 25 the lower part of the bottom trim cap 3 up past the front edge of the insulation 5 under plastic glazing 1 and above absorber 4 flowing past flow spacers 9 up to and thru flow passage 12 which is created when high stagnation temperatures causes plastic glazing 1 to bow inward because of a difference in thermal expansion between the cooler side on the outside of the collector 18 and the hot inner side of plastic glazing 1 inside the collector 18 above the absorber 4. Flow passage 12 is created when the bowing of the plastic glazing 1 causes top glazing seal 20 to open as a result of an edge portion of the plastic glazing 1 pivoting on fulcrum point 11, which is directly below hold down spring 13 which maintains seal 20 when the collector is at normal temperatures, fulcrum point 11 is bent up from vent plain 10 creating passage 12 allowing hot air to escape as illustrated in detail 24 in FIG. 1 and 2.

Referring to FIG. 2, detail 21 illustrates the collector 18 in normal operation which allows for collector temperatures which are high enough to efficiently heat water but low enough to not cause damage to the plastic glazing 1, or the absorber 4. Detail 22 illustrates the collector 18 in a high temperature stagnation condition which will occur when a pump is non operational in a situation such as a power outage. The plastic glazing 1 has bowed in and contacted flow path spacers 9 which allow air flow 8 to pass thru slots, as illustrated in bottom frame detail 23, up the collector and thru air passage 12 shown in detail 24 which opened as described above in FIG. 1 reference.

Referring to FIG. 3, Vented Collector Assembly details show actual measurements and spatial relationships of an existing system with a front view of top frame rail 15 with vent tab 11 details showing vent space created between tabs 11 by bend 10 in top frame 15. Bottom frame rail 2 shows lower slots 7 in a front view for illustration of the spatial relationship necessary to allow for effective venting action.

In FIG. 4A-C, an alternative embodiment of the invention is shown. Detail 21 illustrates the collector in its normal operation. The top frame trim strip 14 forms a seal at 20 with an edge portion of glazing plate 1 and also protects glazing plate 1 and the solar collector from weather. A front view of fulcrum 26 is seen in the detail shown below detail 21. Fulcrum 26 can be a bolt, washer and bolt, screw or other means inserted into glazing plate 1. Detail 22 illustrates the collector in a high temperature stagnation condition. The plastic glazing 1 has bowed in and has contacted flow path spacer 9, allowing air flow 8 to pass through slots 7 shown in FIG. 2, Detail 23, up the collector and thru air passage 12, passing under glazing plate 1 and over glazing plate 1 and under trim strip 14. The air flow exits the collector at the point where glazing plate 1 no longer forms a seal with trim strip 14.

It will be apparent to those skilled in the art that various modifications and variations can be made in the solar collector venting system of the present invention and in constructing this solar collector venting system without departing from the scope or the spirit of the present invention.

Other embodiments of the invention will be apparent to those skilled in the are from consideration of the specification and practice of the invention disclosed herein. It is intended that the specification and examples be considered as exemplary only, with a true scope and spirit of the invention being indicated by the following claims.

What is claimed is:

1. A solar collector with a venting system, the solar collector comprising:
   a frame defining an enclosure having an opening with opposite ends;
   a solar energy absorbing means in the enclosure;
   a glazing plate spaced from the energy absorbing means and having an edge portion closing one end of the enclosure opening; and
   fulcrum means spaced from said edge portion of the glazing plate for supporting the glazing plate in the region of said edge portion;
   said glazing plate having thermal properties so that excessive heat on the inner surface of the glazing plate causes the glazing plate to bow so that said edge portion moves from a closing relation to an open relation with the one end of the enclosure opening.

2. The solar collector as claimed in claim 1, wherein said glazing plate is a twin walled plastic glazing plate.

3. The solar collector as claimed in claim 2, wherein said twin walled plastic glazing plate is a LEXAN TM plate.

4. The solar collector as claimed in claim 1, wherein the solar collector further comprises vent slots spaced from said enclosure opening.

5. The solar collector as claimed in claim 4, wherein said vent slots are located on an angled plane.

6. The solar collector as claimed in claim 4, wherein said vent slots are located within a protective shield.

7. The solar collector as claimed in claim 1, wherein said solar collector further comprises flow path spacers disposed between the inner surface of the glazing plate and the absorbing means so that the flow of air is not blocked when the glazing plate bows.

8. The solar collector as claimed in claim 1, wherein said frame forms a protective shield around said frame opening.

9. The solar collector as claimed in claim 1, wherein said fulcrum means comprises multiple tabs.

10. The solar collector as claimed in claim 9, wherein the bottom surface of said glazing plate edge portion closes the enclosure opening.

11. The solar collector as claimed in claim 9, wherein between said multiple tabs are openings that allow the flow of air to escape from the solar collector frame after said glazing plate bows.

12. The solar collector as claimed in claim 11, wherein the solar collector further comprises a spring attached at one end to said frame and the other end is in communication with the glazing plate to hold said glazing plate in the closed position when the glazing plate is not bowed.

13. The solar collector as claimed in claim 1, wherein said fulcrum means comprises a fulcrum spacer creating a flow path above and below said glazing plate.

14. The solor collector as claimed in claim 13, wherein the top surface of said glazing plate edge portion closes the enclosure opening.

* * * * *

UNITED STATES PATENT AND TRADEMARK OFFICE
CERTIFICATE OF CORRECTION

PATENT NO. : 5,404,867
DATED : April 11, 1995
INVENTOR(S) : Albert C. Rich

It is certified that error appears in the above-indentified patent and that said Letters Patent is hereby corrected as shown below:

Item [76], Inventor:

Title page, line 1, "Dr.." should read --Dr.--.

Claim 14, column 6, line 7, "solor" should read --solar--.

Signed and Sealed this

Twentieth Day of June, 1995

Attest:

BRUCE LEHMAN

Attesting Officer         Commissioner of Patents and Trademarks